United States Patent [19]
Kloeppel

[11] Patent Number: 6,057,982
[45] Date of Patent: May 2, 2000

[54] DISC DRIVE HEAD DISC ASSEMBLY AND PRINTED CIRCUIT BOARD CONNECTED WITH FLEXIBLE CONNECTORS

[75] Inventor: Klaus D. Kloeppel, Watsonville, Calif.

[73] Assignee: Seagate Technology, Inc., Scotts Valley, Calif.

[21] Appl. No.: 09/050,705

[22] Filed: Mar. 30, 1998

Related U.S. Application Data

[60] Provisional application No. 60/042,840, Mar. 31, 1997.

[51] Int. Cl.[7] .................................................. G11B 33/12
[52] U.S. Cl. ...................................................... 360/97.01
[58] Field of Search ............................. 360/97.01, 98.01, 360/105, 106

[56] References Cited

U.S. PATENT DOCUMENTS

| | | | |
|---|---|---|---|
| 5,241,438 | 8/1993 | Matsushima | 360/105 |
| 5,281,160 | 1/1994 | Walkup et al. | 439/266 |
| 5,282,099 | 1/1994 | Kawagoe et al. | 360/97.01 |
| 5,337,202 | 8/1994 | Jabbarai et al. | 360/97.01 |
| 5,646,802 | 7/1997 | Akiyama et al. | 360/98.01 |
| 5,751,514 | 5/1998 | Hyde et al. | 360/97.01 |

*Primary Examiner*—Jefferson Evans
*Attorney, Agent, or Firm*—Edward P. Heller, III; Raghunath S. Minisandram

[57] ABSTRACT

A disc drive has a head disc assembly and a printed circuit board. The head disc assembly has a first connector block with a plurality of first conductors, transmitting signals to and from the head disc assembly. The printed circuit board has a plurality of first electrical pads and a first cutout, the printed circuit board connected to the head disc assembly. A first flexible connection means electrically connects the first conductors of the first connector block of the head disc assembly to the first electrical pads of the printed circuit board, with the first cutout providing wiggle space and permitting accessing, positioning and mating of the first flexible connection means with the first connector block. In a specific embodiment, the first flexible connection means includes a third connector block and a first alignment means. The preferred embodiment of the first alignment means includes a pair of eyelets on the third connector block, a pair of first connector threaded holes on the first connector block and a pair of fasteners to align and fasten the third connector block and the first connector block. An alternate embodiment of first alignment means includes a first positioning pin attached to the third connector block, a first connector hole in the first connector block corresponding to the first positioning pin to receive the first positioning pin and align the third connector block with the first connector block.

10 Claims, 4 Drawing Sheets

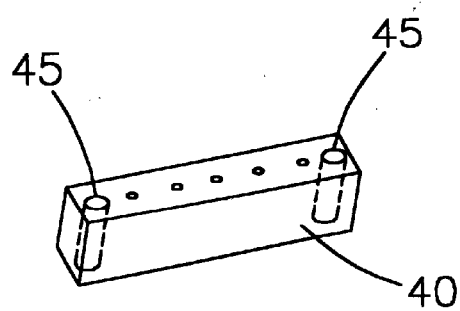
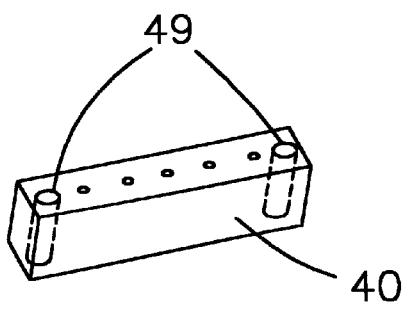
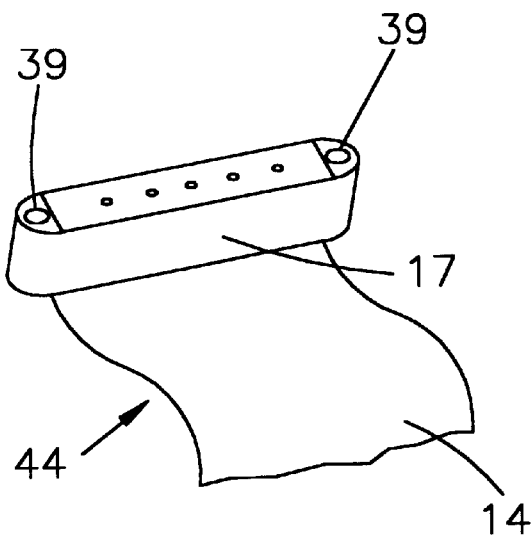
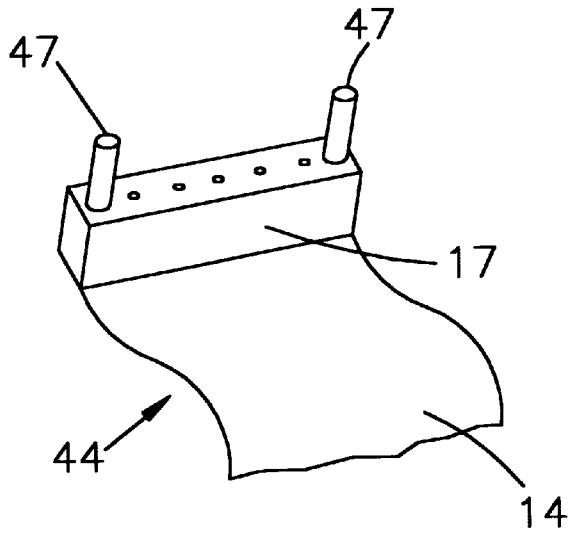
FIG. 3a      FIG. 3b
FIG. 3

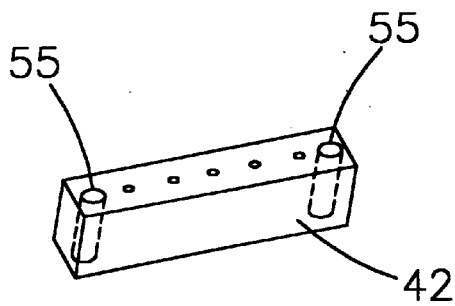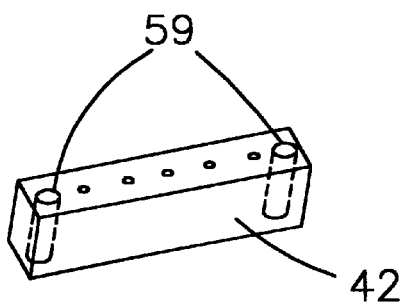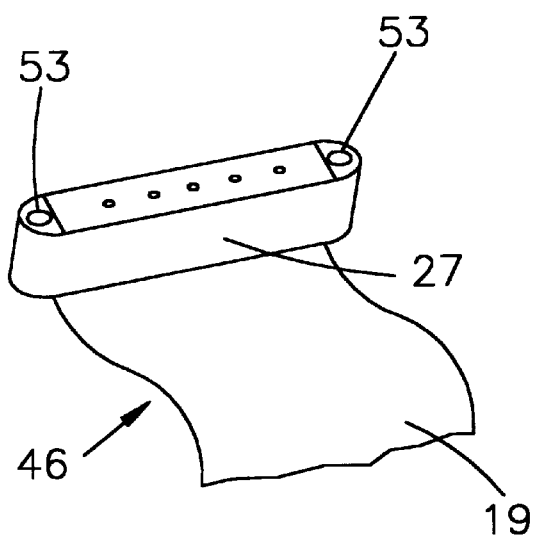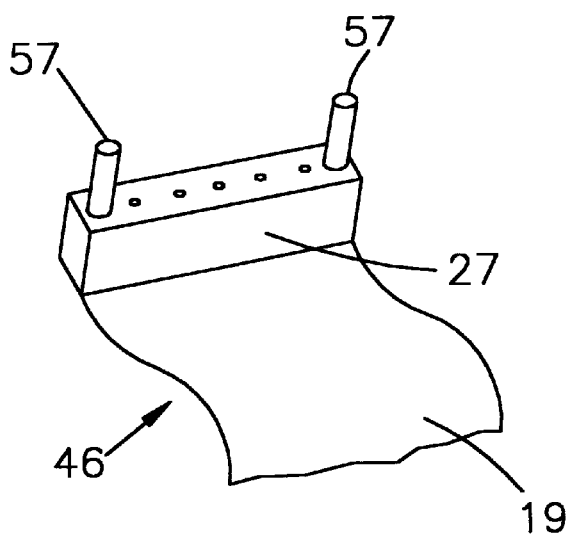
FIG. 4a  FIG. 4b
FIG. 4

DISC DRIVE HEAD DISC ASSEMBLY AND PRINTED CIRCUIT BOARD CONNECTED WITH FLEXIBLE CONNECTORS

This application claims the benefit of provisional application No. 60/042,840 filed on Mar. 31, 1997, entitled Drive PCB With Flexible Header and Motor Connectors.

BACKGROUND OF THE INVENTION

This invention relates to disc drives, and more particularly, to a disc drive PCB with flexible connectors.

Disc drive machines record and reproduce information stored on a recording media. Conventional Winchester-type disc drives include a plurality of vertically-aligned, rotating information storage discs, each having at least one associated magnetic head that is enclosed inside a sealed enclosure (also known as HDA or Head disc assembly) and adapted to transfer information between the disc and an external computer system. The information storage discs are journaled about a spindle motor assembly capable of rotating the discs at high speeds. The heads are carried by a plurality of vertically-aligned, elongated flexure arms that in turn are carried by a head positioner assembly. The head positioner assembly is adapted to move the heads back and forth in unison across the face of the vertically-aligned discs. The head positioner assemblies are traditionally either rotationally mounted, or take the form of a carriage that is free to move back and forth along a single axis. In either case, the head positioner assembly is adapted to precisely position the heads relative to the magnetic information storage discs.

The spindle motor assembly includes a rotatable spindle hub that is carried by a fixed spindle shaft securely mounted to the housing. In the alternative, the rotatable spindle hub may be carried by a rotatable spindle shaft, rotatably mounted to the housing. A plurality of information storage discs are journaled about the spindle hub. Spacer discs are provided between adjacent information storage discs. The vertically aligned information storage discs are clamped to the spindle hub by a disc clamp secured by a plurality of screws.

The electrical signals to and from the heads are carried by a plurality of electrical conductors to a preamplifier circuit. Amplified signals from the preamplifier circuit are made available to a printed circuit board located external to the sealed enclosure using a connector block mounted on the sealed enclosure. In addition, connector blocks mounted on the sealed enclosure are used to receive electrical signals to the positioner motor as well as the spindle motor from the printed circuit board. Complementary connector blocks mounted on the printed circuit board mate with the connector blocks mounted on the sealed enclosure, completing the electrical connections to the printed circuit board.

In U.S. Pat. No. 5,357,386 issued to Haidari et. al on Oct. 18, 1994 and currently assigned to Seagate Technology, Inc., Haidari et. al., disclose a disc drive with two connectors mounted to the base of the HDA casing and a circuit board with complementary connectors which mate with the connectors mounted to the base of the HDA casing, the teachings of which is fully incorporated by reference.

Disc drives are manufactured in high volumes. While the physical size of the disc drives have become smaller, the amount of data stored in a disc drive has increased. Further, there is a need to design disc drives for ease of manufacture and assembly, with minimal manufacturing steps and alignment procedures. The assembly of sealed enclosure takes place in a clean room environment, while the assembly of the printed circuit board takes place outside a clean room environment. As the physical size of the printed circuit board and the sealed enclosure decrease, need to precisely position the connector blocks on the printed circuit board and the connector blocks on the sealed enclosure become critical. Any manufacturing deviations in locating the connector blocks on the sealed enclosure or the printed circuit board will not precisely align the connector blocks, resulting in manufacturing defects and rework. For example, if the disc drive has two pairs of connector blocks as taught by Haidari et. al., and one of the connector blocks either on the printed circuit board or the sealed enclosure is not properly positioned, the connector blocks will not align properly for mating, causing manufacturing defect. In order to minimize manufacturing defects, the manufacturing assembly tolerance and component tolerances have to be specified with minimal allowable deviations, thereby increasing the cost of the assembly process and component prices. Further, as the physical size of the disc drive reduces, allowable deviations are further reduced.

There is a need to minimize the impact of any misaligned connector blocks in the sealed enclosure or the printed circuit board.

There is a need to allow for reasonable manufacturing deviations, without resulting in manufacturing defect.

There is a need to use component specifications allowing for reasonable deviations in dimensions, resulting in a lower cost component.

There is a need to provide for connector blocks on the printed circuit board which easily align and mate with corresponding connector blocks in the sealed enclosure, without requiring any rework.

SUMMARY OF THE INVENTION

Accordingly, it is an objective of the present invention to provide a printed circuit board with flexible connector blocks that align and mate with corresponding connector blocks located on the sealed enclosure.

It is a further object of this invention to allow for reasonable manufacturing deviations in the assembly of the connector blocks, without resulting in a manufacturing or assembly defect.

It is a further objective of this invention to minimize the impact of misaligned connector blocks in the sealed enclosure or the printed circuit board.

It is a further object of this invention to use component specifications allowing for reasonable deviations in dimensions, resulting in a lower cost component.

It is a further object of this invention to provide for connector blocks on the printed circuit board which easily align and mate with corresponding connector blocks in the sealed enclosure, without requiring any rework.

To achieve the foregoing and other objects in accordance with the purpose of the present invention, The disc drive of the present invention includes a head/disc assembly (HDA) with a first connector block having a plurality of first conductors to transmit and receive signals to and from the HDA. A printed circuit board attached to the HDA includes a first flexible connection means and a plurality of first electrical pads. The first flexible connection means includes a first flexible printed circuit cable and a third connector block with a plurality of third conductors. The first flexible printed circuit cable permits the alignment, positioning and mating of third connector block with the first connector block and establishing electrical connection between the plurality of first conductors and the first electrical pads through the plurality of third conductors. In an alternate embodiment, the HDA includes a second connector block having a plurality of second conductors to transmit and receive signals to and from the HDA. The printed circuit board includes a second flexible connection means and a plurality of second electrical pads. The second flexible connection means includes a second flexible printed circuit cable and a fourth connector block with a plurality of fourth conductors. The second flexible printed circuit cable permits the alignment, positioning and mating of fourth connector block with the second connector block and establishing electrical connection between the plurality of second conductors and the first electrical pads through the plurality of fourth conductors. The disc drive of the present invention further includes a first alignment means to align the first connector block with the third connector block and a second alignment means to align the second connector block with the fourth connector block.

BRIEF DESCRIPTION OF THE DRAWINGS

FIGS. 3a and 3b show exploded view of portions of the first flexible connection means and first connector block with preferred and alternate first alignment means respectively.

FIGS. 4a and 4b show exploded view of portions of the second flexible connection means and second connector block, with preferred and alternate second alignment means.

DETAILED DESCRIPTIONS

Figure 1:
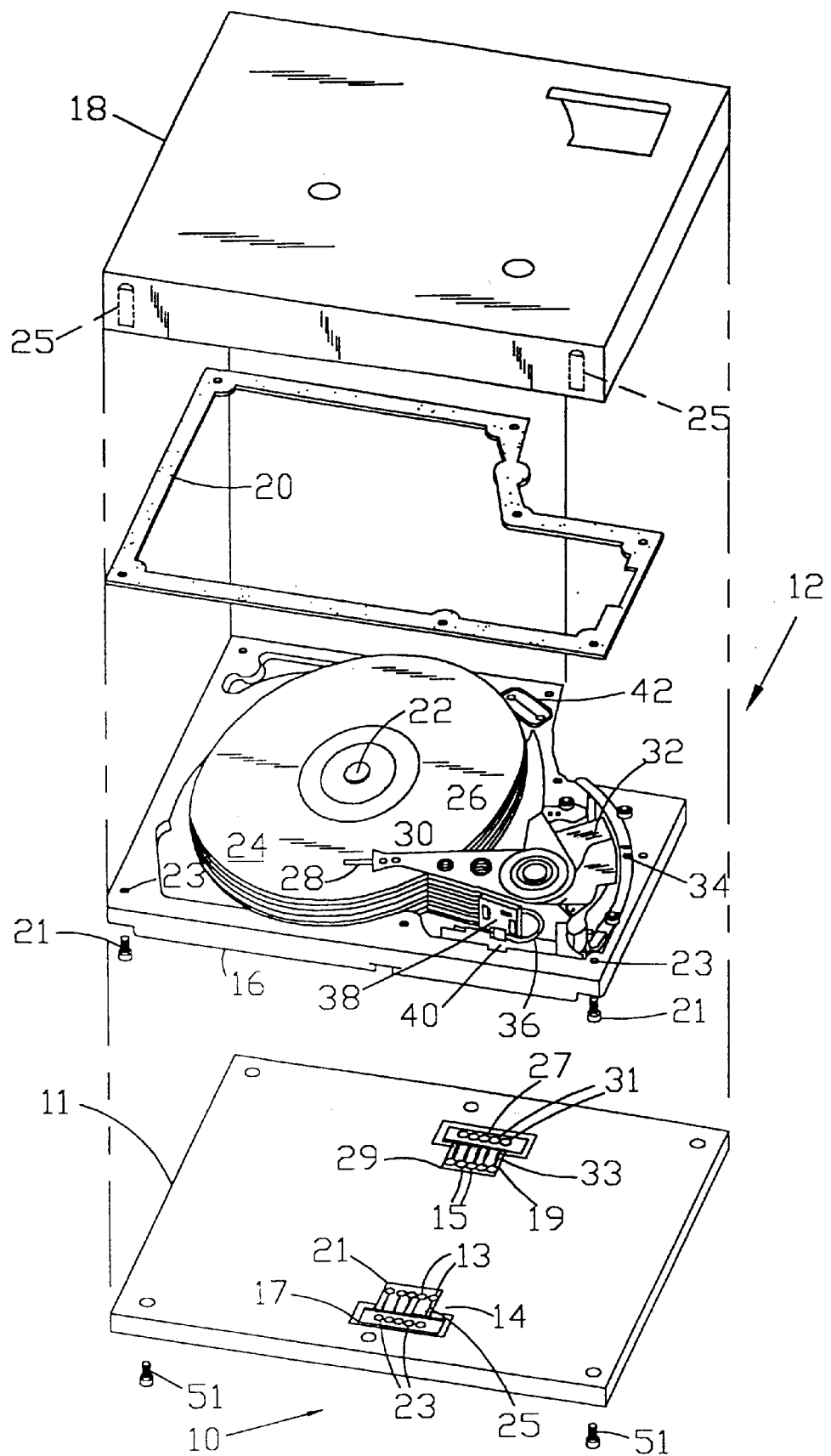
FIG. 1 is an exploded perspective view of a disc drive of the present invention, showing a top casing, a base casing, a spindle motor, a plurality of discs, and an actuator with transducers movably mounted on the actuator, which together form a head/disc assembly (HDA) and the printed circuit board with first flexible connection means and second flexible connection means.

FIG. 1 is an exploded perspective view showing a disc drive 10 of the present invention, showing the printed circuit board 11 and head/disc assembly (HDA) 12. The HDA 12 is contained within base casing 16 and top casing 18. Base casing 16 is the casing to which most of the other components within HDA 12 are mounted.

Prior to the assembly of HDA 12, gasket 20 is positioned into a recess formed along the edge of top casing 18. When HDA 12 is assembled, base casing 16 is fastened to top casing 18 by bolts 21, which are inserted through holes 23 to threaded holes 25.

Within HDA 12 are spindle 22, magnetic discs 24 and actuator assembly 26. Coupled to spindle 22 is a spindle motor which is not shown in this figure. The spindle motor rotates spindle 22 and magnetic discs 24 at a high rate of rotation.

Data is written to and retrieved from discs 24 by transducers 28 (one of which is shown in FIG. 1). Transducers 28 are mounted on arms 30, which are part of actuator assembly 26. Actuator assembly 26 includes a coil 32 which is positioned partially in magnet block assembly 34. The signals required to move actuator assembly 26, along with signals running to and from transducers 28, are provided to the actuator assembly via flexible circuit 36. One end of flexible circuit 36 is attached to circuit board 38, which is mounted on actuator assembly 26. The other end of flexible circuit 36 is attached to first connector block 40 (part of which is shown in FIG. 1). First connector block 40 is mounted in a hole in the bottom of base casing 16. The first connector block 40 includes first conductors 41 (not shown in this FIG. 1, and will be described later with reference to FIG. 2).

In addition to the first connector block 40, second connector block 42 (part of which is shown in FIG. 1) is also mounted in a hole in the bottom of base casing 16. The second connector block includes second conductors 43 (not shown in this FIG. 1, and will be described later with reference to FIG. 2). Second connector block 42 provides electrical signals to the spindle motor.

The printed circuit board 11 includes electronic circuits (not shown) to operate the HDA and communicate with external computer system. Specifically, the printed circuit board includes a plurality of first electrical pads 13 and a plurality of second electrical pads 15. A first flexible connection means 14 connects the first electrical pads 13 with first conductors 41 of first connector block 40 as further described herein below. A second flexible connection means 19 connects the second electrical pads 15 with second conductors 43 of second connector block 42 as further described herein below. Plurality of screws 51 is used to fasten the printed circuit board 11 to the base casing 16.

The first flexible connection means 14 includes a third connector block 17 and a first flexible printed circuit cable 21. The third connector block 17 includes a plurality of third conductors 23 which are physically adapted to mate with the first conductors 41 of first connector block 40. The first flexible printed circuit cable 21 includes a plurality of first PCC conductors 25, one end of which is attached to the third conductors 23 and the other end of which is attached to the first electrical pads 13.

The second flexible connection means 19 includes a fourth connector block 27 and a second flexible printed circuit cable 29. The fourth connector block 27 includes a plurality of fourth conductors 31 which are physically adapted to mate with the second conductors 43 of second connector block 42. The second flexible printed circuit cable 29 includes a plurality of second PCC conductors 33, one end of which is attached to the fourth conductors 31 of fourth connector block 27 and the other end of which is attached to the second electrical pads 15.

Figure 2:
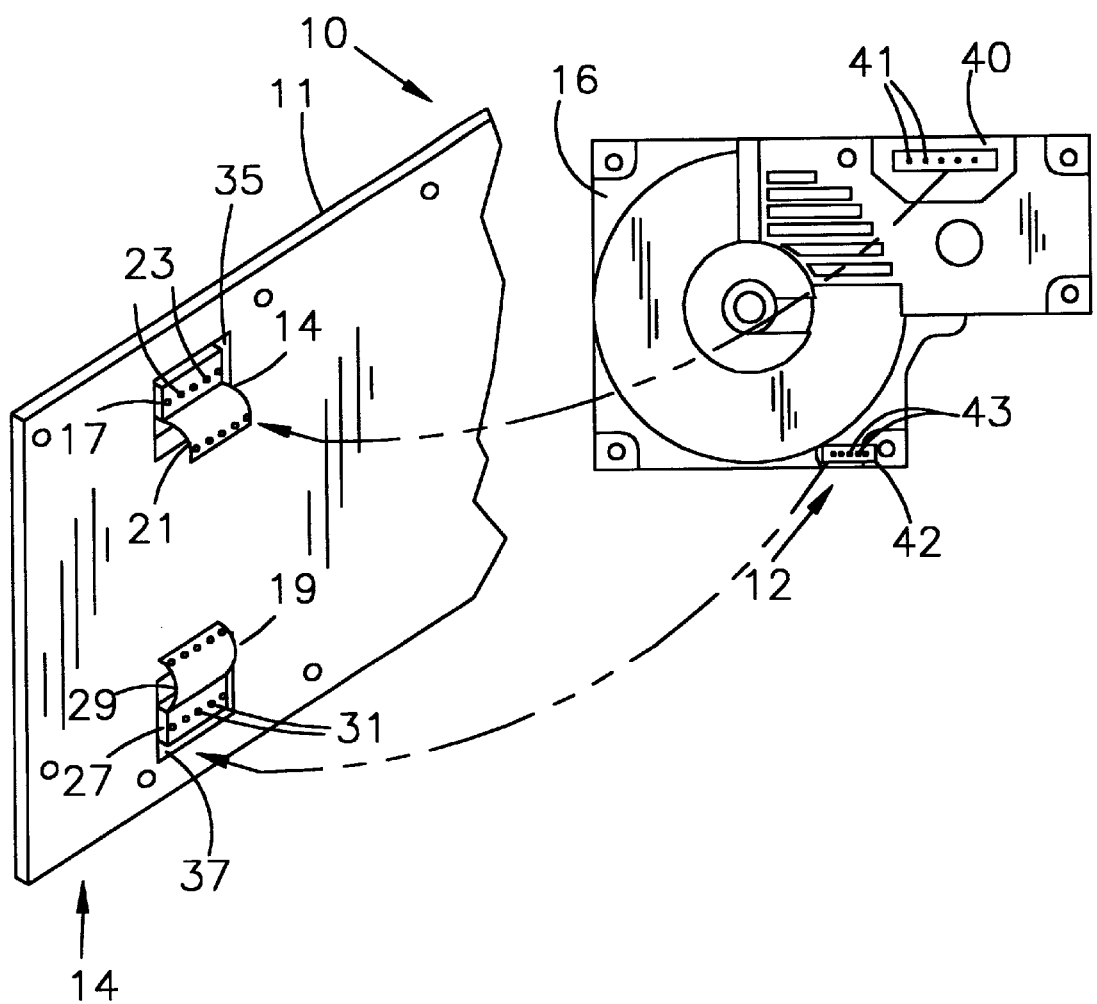
FIG. 2 is an exploded view of a disc drive of the present invention showing the exterior of the HDA with first connector block and second connector block, and the printed circuit board with first flexible connection means and second flexible connection means.

FIG. 2 is an exploded view of a disc drive showing the exterior of the HDA 12 and the printed circuit board 11 of the present invention. The first connector block 40 with a plurality of first conductors 41 and second connector block 42 with a plurality of second conductors 43 is also shown. The printed circuit board 11 includes the first flexible connection means 14 and second flexible connection means 19. The printed circuit board 11 also includes a first cutout 35, larger than the physical size of the third connector block 17 and a second cutout 37 larger than the physical size of the fourth connector block 27.

When the printed circuit board 11 is attached to the base casing 16, the first flexible printed circuit cable 21 allows for properly aligning and positioning the third connector block 17 so as to mate with first connector block 40 and electrically connect the third conductors 23 with first conductors 41 of first connector block 40. The first cutout 35 in the printed circuit board 11 provides for wiggle space permitting the accessing, positioning and mating of the third connector block 17 with the first connector block 40.

Similarly, when the printed circuit board 11 is attached to the base casing 16, the second flexible printed circuit cable 29 allows for properly aligning and positioning the fourth connector block 27 so as to mate with second connector block 42 and electrically connect the fourth conductors 31 with second conductors 43 of second connector block 42. The second cutout 37 in the printed circuit board 11 provides for wiggle space permitting the accessing, positioning and mating of the fourth connector block 27 with the second connector block 42.

FIG. 3 shows portions of the first flexible connection means 14 and first connector block 40 with preferred and alternate first alignment means 44 respectively.

FIG. 3a shows the preferred embodiment of first alignment means 44, which includes a pair of first eyelets 39 on the third connector block 17 and first connector threaded holes 45 in first connector block 40, so that a pair of fasteners (not shown) could be used to align and fasten the third connector block 17 to the first connector block 40.

FIG. 3b shows an alternate embodiment of the first alignment means 44, which includes a positioning pin 47 attached to the third connector block 17, with a corresponding first connector hole 49 in the first connector block 40 to receive the first positioning pin 47 and aligning the third connector block 17 with first connector block 40.

FIG. 4 shows portions of the second flexible connection means 19 and second connector block 42 with preferred and alternate second alignment means 46 respectively.

FIG. 4a shows the preferred embodiment of second alignment means 46, which includes a pair of second eyelets 53 on the fourth connector block 27 and second connector threaded holes 55 in second connector block 42, so that a pair of fasteners (not shown) could be used to align and fasten the fourth connector block 27 to the second connector block 42.

FIG. 4b shows an alternate embodiment of the second alignment means 46, which includes a second positioning pin 57 attached to the fourth connector block 27, with a corresponding second connector hole 59 in the second connector block 42 to receive the second positioning pin 57 and aligning the fourth connector block 27 with second connector block 42.

Even though the disclosure discloses a disc drive with two connectors on the HDA, the invention can be applied to a disc drive having a single connector block on the HDA. Further, the invention can be applied to a disc drive using various other aligning means including using connector pairs which snap and lock with each other.

From the above description, it is apparent that many modifications and variations of the present invention are possible in light of the above teachings. It is therefore to be understood that, within the scope of the appended claims, the invention may be practiced otherwise than as specifically described hereinabove.

I claim:

1. A disc drive having:
    a head disc assembly having a first connector block with a plurality of first conductors, said plurality of first conductors transmitting signals to and from said head disc assembly;
    a printed circuit board having a plurality of first electrical pads and a first cutout, said printed circuit board connected to said head disc assembly and
    a first flexible connection means electrically connecting said first conductors of said first connector block to said first electrical pads of said printed circuit board, said first cutout providing wiggle space and permitting the accessing, positioning and mating of said first flexible connection means with said first connector block.

2. A disc drive as claimed in claim 1 wherein said first flexible connection means further including:
    a third conductor block having a plurality of third conductors, said third conductors electrically connected to said first conductors of said first connector block and
    a first flexible printed circuit cable having plurality of first PCC conductors, first end of said plurality of first PCC conductors connected to said plurality of third conductors of said third connector block, second end of said plurality of first PCC conductors connected to said plurality of first electrical pads of said printed circuit board.

3. A disc drive as claimed in claim 1 further including a first alignment means to align said first flexible connection means to said first connector block.

4. A disc drive as claimed in claim 3, wherein said first alignment means includes
    a pair of first eyelets on said third connector block;
    a pair of first connector threaded holes on said first connector block and
    a pair of fasteners to align and fasten said third connector block and said first connector block.

5. A disc drive as claimed in claim 3, wherein said first alignment means includes
    a first positioning pin attached to said third connector block and
    a first connector hole in said first connector block corresponding to said first positioning pin to receive said first positioning pin and align said third connector block with said first connector block.

6. A disc drive as claimed in claim 1 wherein
    said head disc assembly further including a second connector block with plurality of second conductors, said plurality of second conductors transmitting signals to and from the head disc assembly;
    said printed circuit board having a plurality of second electrical pads and a second cutout and
    a second flexible connection means electrically connecting said plurality of second conductors of said second connector block to said second electrical pads of said printed circuit board, said second cutout providing wiggle space and permitting the accessing, positioning and mating of said second flexible connection means with said second connector block.

7. A disc drive as claimed in claim 6 wherein said second flexible connection means further including:
    a fourth conductor block having a plurality of fourth conductors, said fourth conductors electrically connected to said second conductors of said second connector block and
    a second flexible printed circuit cable having plurality of second PCC conductors, first end of said plurality of second PCC conductors connected to said plurality of fourth conductors of said fourth connector block, second end of said plurality of second PCC conductors connected to said plurality of second electrical pads of said printed circuit board.

8. A disc drive as claimed in claim 6 further including a second alignment means to align said second flexible connection means to said second connector block.

9. A disc drive as claimed in claim 8, wherein said second alignment means includes
- a pair of second eyelets on said fourth connector block;
- a pair of second connector threaded holes on said second connector block and
- a pair of fasteners to align and fasten said fourth connector block and said second connector block.

10. A disc drive as claimed in claim 8, wherein said first alignment means includes
- a second positioning pin attached to said fourth connector block and
- a second connector hole in said second connector block corresponding to said positioning pin to receive said second positioning pin and align said fourth connector block with said second connector block.

* * * * *